United States Patent [19]

Saarem et al.

[11] 4,180,236
[45] Dec. 25, 1979

[54] NORMALLY-OPEN VALVE ASSEMBLY WITH SOLENOID-OPERATED PILOT

[75] Inventors: Myrl J. Saarem, Carson City, Nev.; Dale F. Soukup, Meadow Vista, Calif.

[73] Assignee: Richdel, Inc., Carson City, Nev.

[21] Appl. No.: 689,155

[22] Filed: May 24, 1976

[51] Int. Cl.² ............. F16K 31/385; F16K 31/40
[52] U.S. Cl. .................................. 251/30; 251/42; 251/46
[58] Field of Search ............... 251/46, 42, 30, 43

[56] References Cited

U.S. PATENT DOCUMENTS

| 1,055,161 | 3/1913 | Geissinger | 251/43 X |
| 1,114,431 | 10/1914 | Bopp | 251/43 X |
| 3,367,621 | 2/1968 | Griswold | 251/46 X |
| 3,799,496 | 3/1974 | Esten | 251/46 X |
| 3,967,808 | 7/1976 | Lieding | 251/46 |

Primary Examiner—Arnold Rosenthal
Attorney, Agent, or Firm—Keith D. Beecher

[57] ABSTRACT

A normally-open pilot-operated valve assembly is provided which closes when a solenoid-operated pilot valve is energized. The pilot valve is open when the solenoid is de-energized to remove fluid pressure from a chamber in the valve housing causing the main valve to open. When the solenoid is energized, the pilot valve closes causing hydraulic pressure to build up in the valve chamber so that the main valve is closed. The solenoid-operated valve includes a plunger which extends into a discharge port, the plunger having a spherical member attached to its distal end which is drawn inwardly against a seat in the pilot discharge port to close the port when the pilot solenoid is energized.

3 Claims, 2 Drawing Figures

FLUID FLOW OUT

FLUID FLOW IN

NORMALLY-OPEN VALVE ASSEMBLY WITH SOLENOID-OPERATED PILOT

BACKGROUND OF THE INVENTION

Valve assemblies using solenoid-operated pilots are known which are normally closed, and which open when the solenoid is energized to close the pilot valve. Such a valve is described, for example, in U.S. Pat. No. 3,410,301 which issued Nov. 12, 1968, and which is assigned to the present assignee. However, in many applications normally-open valves are required which close when the solenoid pilot is energized.

Typically in the prior art, the normally-open pilot-controlled valve is provided by controlling the pressure in the valve chamber above the valve actuator by the use of a three-way pilot solenoid valve controlling the fluid pressure in the chamber. A second prior art normally-open pilot-operated valve assembly includes a divider member which defines a lower valve chamber below the valve actuator which may be pressurized by use of a conventional solenoid-operated pilot valve which closes when energized to cause a build up of fluid pressure in the lower valve chamber.

However, the prior art normally-open solenoid-operated pilot type valves, as described briefly in the previous paragraph, are relatively complex and expensive. The valve of the present invention, on the other hand, is simple and inexpensive.

In the assembly of the present invention, the pilot valve is constructed to be open when its solenoid is de-energized, thereby relieving the pressure in the valve chamber above the valve actuator so that the main valve is open. However, the pilot valve is constructed in the assembly of the invention so that when the pilot solenoid is energized, its plunger is drawn inwardly to close, rather than open, the pilot valve, thereby permitting pressure to build up in the valve chamber above the valve actuator to cause the main valve to close. The provision of such a pilot valve in the assembly represents a simple means for converting a normally-closed valve into a normally-open valve with a minimum amount of modification.

DETAILED DESCRIPTION OF THE ILLUSTRATED EMBODIMENT

Figure 1:
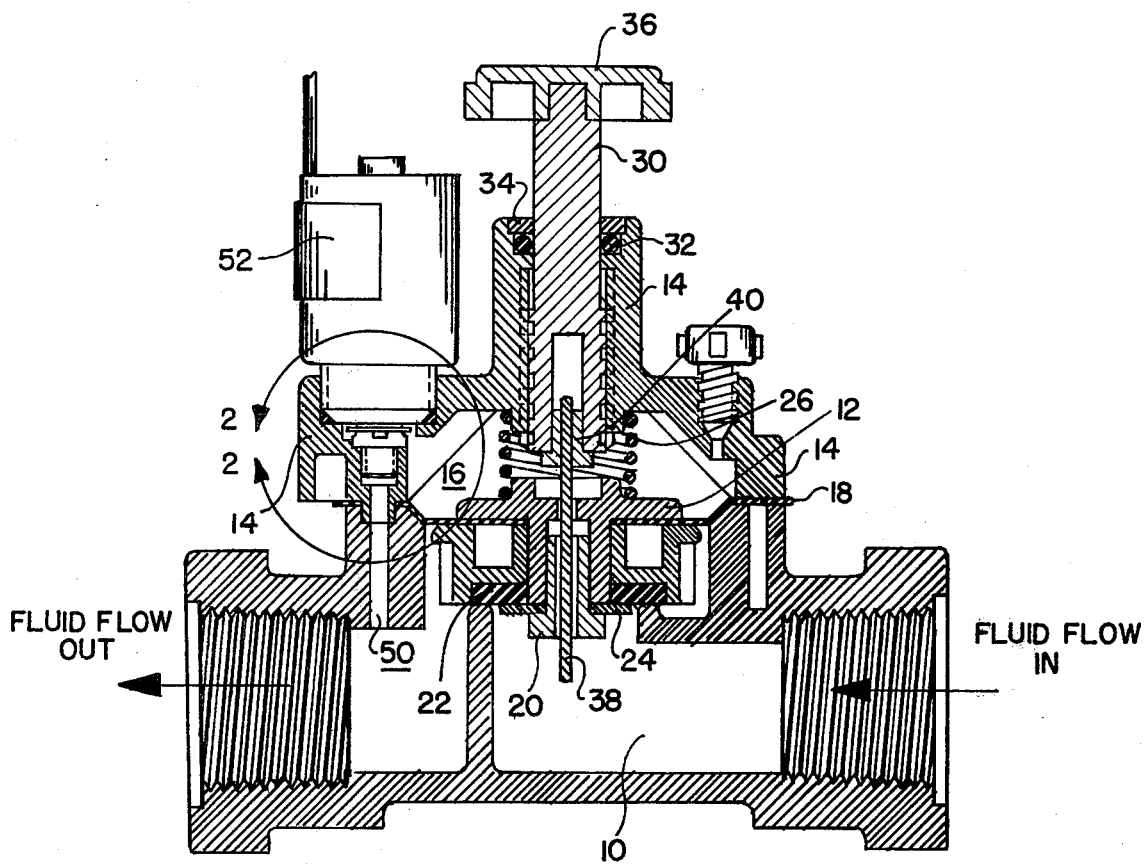
FIG. 1 is a side section showing a valve assembly constructed to incorporate the principles of the invention.

The valve assembly shown in the drawing includes a valve body 10 through which fluid, such as water, flows from right to left. A valve actuator 12 is included in the valve assembly, and the valve actuator is movable to seat against the valve body 10 to control the flow of fluid through the valve body. A valve cover 14 is provided which is secured to the valve body 10 by any appropriate means. The valve cover 14 defines a primary valve chamber 16 which contains the valve actuator 12, and the valve cover also defines an auxiliary valve chamber 17 (FIG. 2) in communication with the primary valve chamber. Valve actuator 12 is supported on a diaphragm 18 which is mounted between cover 14 and body 10, and which serves as a seal for valve chamber 16.

Valve actuator 12 has an opening extending therethrough, and a bushing 20 is supported in the opening. A rubber washer 22 is mounted on the underside of the valve actuator to seat against the valve body when the valve is closed. Washer 22 is held in place by a retainer ring 24 and bushing 20. A spring 26 is mounted in the valve chamber 16 which biases the valve actuator 12 to its closed position.

A handle 30 is threaded into cover 14, and is sealed by an O-ring 32 which is held in place by a retainer ring 34. A knob 36 is provided at the upper end of handle 30. The handle may be screwed down against the valve actuator 12 to limit the solenoid controlled pilot action to be described, so as to adjust the flow through the valve.

A cleaning pin 38 is mounted in a grommet 40 in the lower end of handle 30, the pin extending down through the valve actuator 12 and through a bushing 20. The pin is stationary as the valve actuator moves, and provides a self-cleaning action in a bleed port extending into valve chamber 16 through the bushing 20 and through the valve actuator 12.

Figure 2:
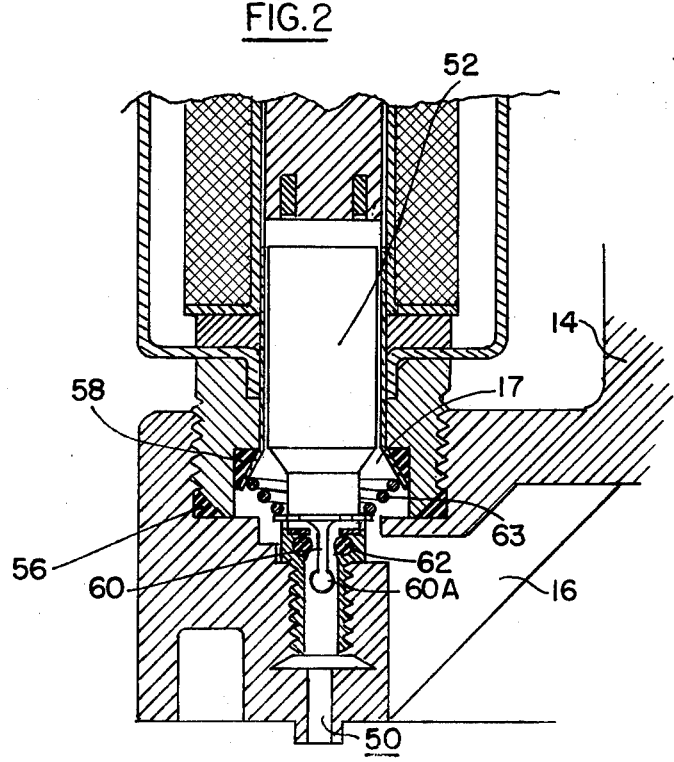
FIG. 2 is an enlarged fragmentary detail within the circle designated 2—2 in FIG. 1.

The cover also defines a pilot discharge port 50, and the flow of fluid from the auxiliary valve chamber 17 through the discharge port 50 is controlled by a solenoid-operated pilot valve 52 mounted in the auxiliary valve chamber. As best shown in FIG. 2, the solenoid-operated pilot valve 52 is threaded through the cover 14 into the auxiliary valve chamber 17, and is sealed by appropriate seals 56 and 58. The solenoid valve 52 includes a plunger 60 which extends into the discharge port 50.

When the solenoid is de-energized, the plunger 60 of the solenoid-operated pilot valve is biased by spring 63 to the position shown in FIG. 2, in which fluid is free to flow from the auxiliary valve chamber 17 through the discharge port 50. However, when the solenoid is energized, plunger 60 draws a spherical extension 60A attached to its distal end against an O-ring valve seat 62 in the discharge port 50 to close the discharge port 50.

Therefore, when the pilot solenoid is de-energized, the discharge port 50 is open so that no pressure build-up can be achieved in the valve chamber 16, and the valve actuator 12 is moved upwardly by the water pressure in the valve body and the valve is open.

However, when the pilot solenoid is energized, the plunger 60 is drawn inwardly and the spherical extension 60A seats against the seat 62, causing the discharge port 50 to be closed. The fluid now flows through the bleed port into the valve chamber 16, and the resulting pressure build-up causes the main valve to close.

The invention provides, therefore, a simple and inexpensive valve assembly which is controlled by a solenoid-operated pilot valve to be open when the solenoid is de-energized and to be closed when the solenoid is energized.

It will be appreciated that although a particular embodiment of the invention has been shown and described, modifications may be made. It is intended in the claims to cover the modifications which come within the spirit and scope of the invention.

What is claimed is:

1. A normally-open valve assembly for controlling fluid flow, said valve assembly including: a casing defining a primary valve chamber and an auxiliary valve chamber communicating with said primary valve chamber, said auxiliary valve chamber having a discharge port providing an outlet from said auxiliary valve chamber, and at least one of the auxiliary and primary valve chambers having a bleed port providing an inlet into said valve chambers; a valve actuator movable in said primary valve chamber between a first position in which the valve is open and a second position in which the valve is closed; a manually operated handle threaded into said casing in position to engage said valve actuator to move said valve actuator towards its second position to limit the movement of the valve actuator; a valve seat included in said discharge port; a normally-open solenoid-operated valve positioned in said auxiliary valve chamber and having a plunger extending into said discharge port beyond said seat; a member attached to the distal end of the plunger having a diameter greater than the diameter of said plunger; a spring normally biasing said plunger to an open position in said discharge port in which said member attached to the distal end of the plunger is displaced from said seat so as to permit the discharge of fluid from the auxiliary valve chamber and from the primary valve chamber when the solenoid is de-energized so that there is insufficient pressure exerted on the valve actuator to hold the valve actuator at its second position whereby said valve actuator is established at its first position, said solenoid-operated valve drawing said member at the distal end of said plunger against said seat to close said discharge port when the solenoid is energized to block the flow of fluid through said discharge port so as to cause a build-up of pressure in said primary valve chamber causing said valve actuator to move to its second position.

2. The valve assembly defined in claim 1, in which said discharge port includes an O-ring seat, and said solenoid-operated valve includes a spherical member attached to the distal end of said plunger to be drawn inwardly and seat against the O-ring seat in said discharge port when the solenoid is energized.

3. The valve assembly defined in claim 1, in which said valve actuator has an opening therein defining said bleed port, and which includes a pin mounted on said handle and extending into the opening in said valve actuator to provide a self-cleaning action in said bleed port.

* * * * *